US010922986B2

(12) United States Patent
Rutkiewicz et al.

(10) Patent No.: US 10,922,986 B2
(45) Date of Patent: Feb. 16, 2021

(54) TAXI STRIKE ALERT SYSTEM

(71) Applicant: Simmonds Precision Products, Inc., Vergennes, VT (US)

(72) Inventors: Robert Rutkiewicz, Edina, MN (US); Todd Anthony Ell, Savage, MN (US); Joseph T. Pesik, Eagan, MN (US)

(73) Assignee: Simmons Precision Products, Inc., Vergennes, VT (US)

( * ) Notice: Subject to any disclaimer, the term of this patent is extended or adjusted under 35 U.S.C. 154(b) by 0 days.

(21) Appl. No.: 16/038,984

(22) Filed: Jul. 18, 2018

(65) Prior Publication Data
US 2020/0027361 A1 Jan. 23, 2020

(51) Int. Cl.
*G08G 5/04* (2006.01)
*G06T 7/586* (2017.01)
*G06T 7/579* (2017.01)
*G06T 7/536* (2017.01)
*G06T 7/521* (2017.01)
*B64D 43/00* (2006.01)
(Continued)

(52) U.S. Cl.
CPC ............ *G08G 5/045* (2013.01); *B64D 43/00* (2013.01); *B64D 47/06* (2013.01); *G06T 7/521* (2017.01); *G06T 7/536* (2017.01); *G06T 7/579* (2017.01); *G06T 7/586* (2017.01); *G08G 5/065* (2013.01); *H04N 5/247* (2013.01); *G06K 9/00624* (2013.01); *G06T 2207/10028* (2013.01); *G06T 2207/10152* (2013.01)

(58) Field of Classification Search
CPC ........ G08G 5/045; G08G 5/065; G06T 7/536; G06T 7/579; G06T 7/521; G06T 7/586; G06T 2207/10152; G06T 2207/10028; B64D 43/00; B64D 47/06; H04N 5/247; G06K 9/00624
See application file for complete search history.

(56) References Cited

U.S. PATENT DOCUMENTS 8,779,943 B2 7/2014 Wolcken et al.
9,858,682 B2 1/2018 Heidemann et al.
(Continued)

FOREIGN PATENT DOCUMENTS

EP 2187372 A1 5/2010
EP 2892040 A1 7/2015
(Continued)

OTHER PUBLICATIONS

Extended European Search Report dated Dec. 10, 2019, received for corresponding European Application No. 19183909.1, 6 pages.

*Primary Examiner* — Tat C Chio
(74) *Attorney, Agent, or Firm* — Kinney & Lange, P.A.

(57) ABSTRACT

A system includes a first smart sensor, a second smart sensor, and at least one image processor. The first smart sensor is configured to sense light in a forward direction and to capture an image during a first time period. The second sensor is configured to sense light in the forward direction and to capture a second image during the first time period. The at least one image processor is configured to identify at least one object in the first and second image, to determine a first size of the at least one object in the first image and a second size of the at least one object in the second image, and to determine a distance of the at least one object from the aircraft based upon the first size and the second size.

19 Claims, 3 Drawing Sheets

(51) Int. Cl.
*B64D 47/06* (2006.01)
*G08G 5/06* (2006.01)
*H04N 5/247* (2006.01)
*G06K 9/00* (2006.01)

(56) References Cited

U.S. PATENT DOCUMENTS

| | | |
|---|---|---|
| 9,911,344 B2 | 3/2018 | Kabrt et al. |
| 2015/0174981 A1* | 6/2015 | Buma ................ B60G 17/0165 701/38 |
| 2015/0329217 A1* | 11/2015 | Kirk ....................... B64D 45/00 701/301 |
| 2017/0025024 A1* | 1/2017 | Kabrt ................. G06K 9/00664 |
| 2017/0142312 A1 | 5/2017 | Dal Mutto et al. |
| 2017/0301250 A1* | 10/2017 | Ell ......................... B64D 43/00 |
| 2017/0341599 A1* | 11/2017 | Bokor ........................ B60J 3/04 |
| 2017/0374352 A1 | 12/2017 | Horesh |
| 2018/0091797 A1 | 3/2018 | Armatorio et al. |
| 2018/0096610 A1 | 4/2018 | Ray et al. |

FOREIGN PATENT DOCUMENTS

| | | |
|---|---|---|
| EP | 3235735 A1 | 10/2017 |
| WO | 2006027762 A1 | 3/2006 |

\* cited by examiner

US 10,922,986 B2

TAXI STRIKE ALERT SYSTEM

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin. Some commercial and some military planes have engines that hang below the wings of the aircraft. Pilots, positioned in the cabin, can have difficulty knowing the risk of collisions between the wingtips and/or engines and other objects external to the aircraft. An aircraft on-ground collision alerting system would be useful to survey the area forward or aft of the tail, wingtips and/or engines, to detect obstructions with sufficient range and measurement resolution in a potential collision path, and to provide visual and audible alerts to the cockpit.

SUMMARY

In one example, a system comprises a first smart sensor, a second smart sensor, and at least one image processor. The first smart sensor is attachable to a front portion of an aircraft along a longitudinal axis of the aircraft. The first smart sensor is configured to sense light in a forward direction when attached to the aircraft and to capture an image during a first time period. The second smart sensor is attachable to a rear portion of an aircraft along the longitudinal axis of the aircraft. The second sensor is configured to sense light in the forward direction and to capture a second image during the first time period. The at least one image processor is configured to identify at least one object in the first and second images, to determine a first size of the at least one object in the first image and a second size of the at least one object in the second image, and to determine a distance of the at least one object from the aircraft based upon the first size and the second size.

In one example, a method comprises capturing an image in a forward direction of an aircraft during a first time period using a first smart sensor attachable to a front portion of an aircraft along a longitudinal axis of the aircraft; capturing a second image in the forward direction during the first time period using a second smart sensor attachable to a rear portion of an aircraft along the longitudinal axis of the aircraft; identifying at least one object in the first and second images using at least one image processor; determining a first size of the at least one object in the first image using the at least one image processor; determining a second size of the at least one object in the second image using the at least one image processor; and determining a distance of the at least one object from the aircraft based upon the first size and the second size using the at least one image processor.

In one example, a system comprises a first smart sensor, a second smart sensor, and a controller. The first smart sensor is attachable to a front portion of an aircraft along a longitudinal axis of the aircraft. The first smart sensor comprises a first image sensor, a projector, and an image processor. The first image sensor is configured to sense light in a forward direction of the aircraft and to capture an image during a first time period. The projector is configured to project structured light. The second smart sensor is attachable to a rear portion of an aircraft along the longitudinal axis of the aircraft. The second smart sensor comprises a second image sensor configured to sense light in the forward direction and to capture a second image during the first time period. The controller is configured to provide control signals to the first and second smart sensors. The control signals including data to indicate the first time period and the pattern of the structured light. The image processor is configured to identify at least one object in the first and second images, to determine a first size of the at least one object in the first image and a second size of the at least one object in the second image, and to determine a distance of the at least on object from the aircraft based upon the first size and the second size.

DETAILED DESCRIPTION

Apparatus, systems, and associated methods relate to object distance detection using longitudinally mounted smart sensors. In some applications, such as moving an aircraft on the ground, distance to objects can be difficult to ascertain from the aircraft cockpit. In some cases, objects may not be visible at all from the cockpit. Using the apparatus, systems, and associated methods herein, allows the detection of objects and accurate detection of the objects' distances from the aircraft. Dual smart sensors located at the front and rear of the aircraft are used to capture images towards the front of the aircraft. The distances of objects in front of the aircraft are determined from the images based upon relative size, light gradients, optical flow, and/or shadows cast by the objects. In this way, accurate distances to objects are communicated to the pilots assisting the pilots in avoiding costly collisions.

Figure 1:
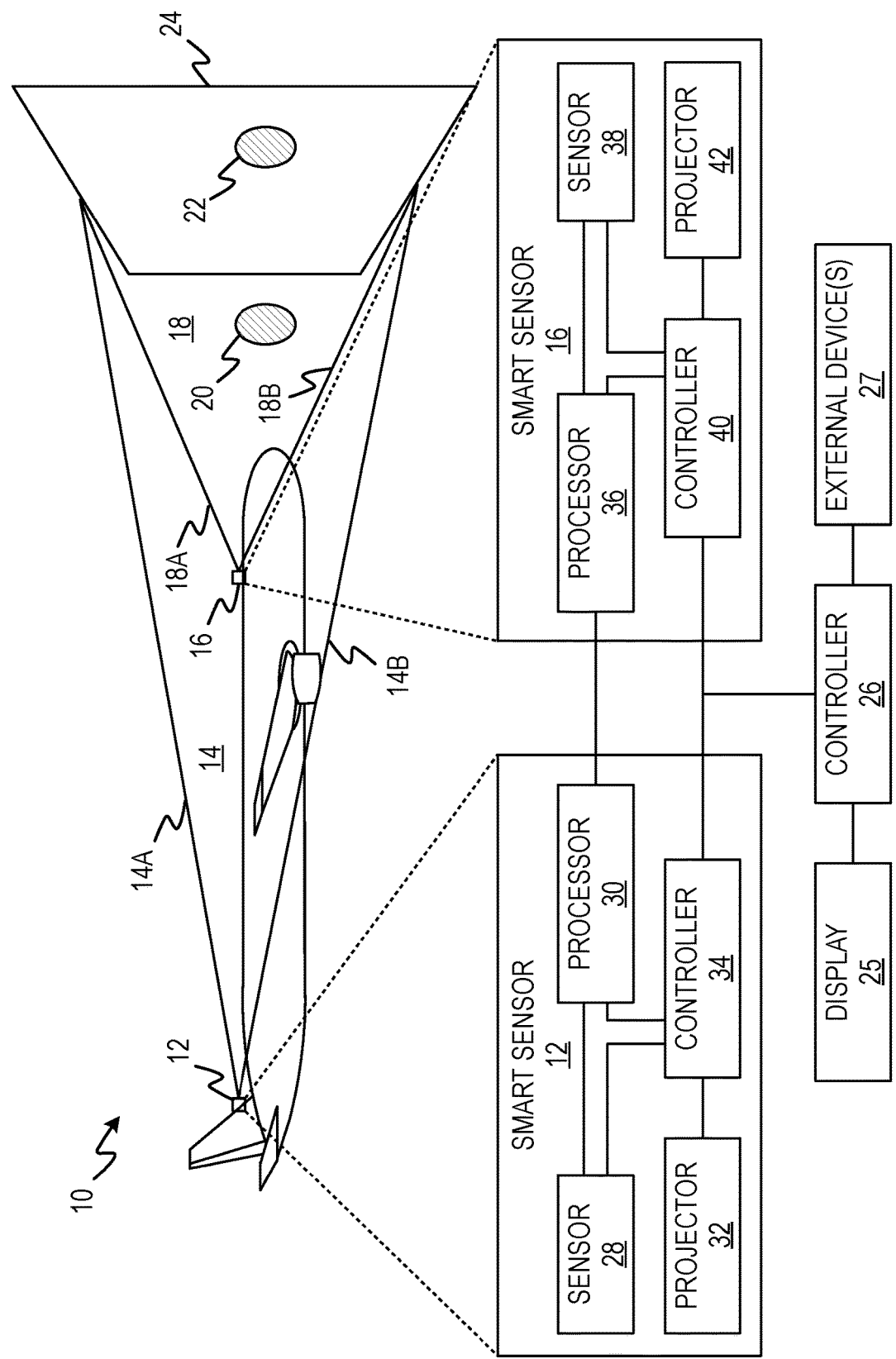
FIG. 1 is a schematic view of a taxi strike alert system.

FIG. 1 is a schematic view of a taxi strike alert system including aircraft 10, smart sensor 12 having field of view 14, smart sensor 16 having field of view 18, objects 20 and 22, calibrated distance 24, display 25, controller 26, and external device(s) 27. Field of view 14 is shown by solid lines 14A and 14B. Field of view 18 is shown by solid lines 18A and 18B. Smart sensor 12 includes image sensor 28, image processor 30, projector 32, and controller 34. Smart sensor 16 includes image processor 36, image sensor 38, controller 40, and projector 42.

As shown, smart sensor 12 is located at towards the front of aircraft 10. Smart sensor 16 is located towards the rear of aircraft 10. Smart sensors 12 and 16 are arranged along a longitudinal axis of aircraft 10. Smart sensors 12 and 16 are communicatively coupled via image processors 30 and 36. Smart sensors 12 and 16 are also communicatively coupled to each other and display 25 via controllers 34, 40, and 43. Image sensor 28 is communicatively coupled to image processor 30 and controller 34. Projector 32 is communicatively coupled to controller 34. Controller 34 is additionally communicatively coupled to image processor 30. Image sensor 38 is communicatively coupled to image processor 36 and controller 40. Projector 42 is communicatively coupled to controller 40. Object 20 is located between the front of aircraft 10 and calibrated distance 24. Object 22 is located in front of aircraft 10 at calibrated distance 24. Controller 40 is additionally communicatively coupled to image processor 36.

Smart sensor 12 is configured to sense light and capture an image using image sensor 28. In some examples, smart sensor 12 is a camera including optical lenses. Captured images include objects 20 and 22. Field of view 14 indicates the region that smart sensor 12 is configured to sense light from and capture an image of. Field of view 14 is oriented in the forward direction of aircraft 10 along the longitudinal axis. The width and height of field of view 14 are configurable to include the wings of aircraft 10, runway surfaces, or other details of interest to a pilot of aircraft 10. Images captured using image sensor 28, are provided to image processor 30. Smart sensor 16 is configured to sense light and capture an image using image sensor 38. Captured images include objects 20 and 22. Field of view 18 indicates the region that smart sensor 14 is configured to sense light from and capture an image of. Field of view 18 is oriented in the forward direction of aircraft 10 along the longitudinal axis. The width and height of Field of view 18 is configurable to include runway surfaces, the fuselage of aircraft 10, or other details of interest to the pilot. Images captured by image sensor 38, are provided to image processor 36.

Smart sensor 16 is configured to provide light using projector 32. In some examples, smart sensor 16 is a camera including optical lenses. Smart sensor 16 can provide light directed to an object, such as object 20 or 22. Projector 32 can be a light array, a spotlight, or other lighting device capable of providing and directing light. Projector 32 can be configured to provide visible light, infrared light, or other light. Projector 32 can be configured provide light structured in a pattern for image processing purposes. Projector 32 can be configured to provide light within a known cone. The qualities of the light provided by projector 32 are based upon command signals provided by controller 34. Smart sensor 16 is configured to provide light using projector 42. Smart sensor 16 can provide light directed to an object, such as object 20 or 22. Projector 42 can be a light array, a spotlight, or other lighting device capable of providing and directing light. Projector 42 can be configured to provide visible light, infrared light, or other light. Projector 42 can be configured provide light structured in a pattern for image processing purposes. Projector 42 can be configured to provide light within a known cone. The qualities of the light provided by projector 42 are based upon command signals provided by controller 40.

Controller 34 provides control signals to image sensor 28 and projector 32. Control signals to projector 32 include the timing and qualities of light to be provided by projector 32. Control signals to image sensor 28 include image capture timings. Controller 34 receives image data from image processor 30 and provides it to controller 26 for display on display 25. Image data includes captured images and the distance of objects 20 and 22 from aircraft 10. Controller 40 provides control signals to image sensor 38 and projector 42. Control signals to projector 42 include the timing and qualities of light to be provided by projector 42. Control signals to image sensor 38 include image capture timings. Controller 40 receives image data from image processor 36 and provides it to controller 26 for display on display 25. Image data includes captured images and the distance of objects 20 and 22 from aircraft 10. Controller 26 is configured to display captured images on display 25, including an overlay indicating the distance of objects 20 and 22 from aircraft 10. In one example controllers 27, 34, and 40 coordinate control signals and timings. In another example one of controllers 27, 34, and 40 dictates the control signals and timings and the other controllers provide control signals accordingly. In still another example smart sensors 12 and 16 do not include controllers and all control signals are provided by controller 26. Controller 26 is configured to send and receive data to external device(s) 27. External device(s) 27 can include aircraft light sources, aircraft computing systems, alarms, etc.

Image processors 30 and 36 are configured to determine the distances of objects 20 and 22 from aircraft 10 in images captured by images sensors 28 and 38. The distance could be the distance to the nose, a wing, an engine, or other portion of aircraft 10. In one example, the distances of objects 20 and 22 are determined based upon their relative size in an image captured by image sensor 28 and an image captured by image sensor 38. In this example, the images captured by image sensor 28 and 38 are captured during a time period. The relative size of objects 20 and 22 between images captured by image sensors 28 and 38 depends on the distance of objects 20 and 22 from aircraft 10 relative to calibrated distance 24. Objects that are closer to aircraft 10 than calibrated distance 24, such as object 20, will appear larger in an image captured by image processor 38 than in an image taken during the time period by image processor 28. Objects at calibrated distance 24, such as object 22, will appear the same size in images taken by image processors 28 and 38 when taken at the same time. Objects farther from aircraft 10 than calibrated distance 24 will appear larger in an image captured by image processor 28 than in an image taken during the time period by image processor 38. Calibrated distance 24 is determined after smart sensors 12 and 16 are installed on aircraft 10. In one example, calibrated distance 24 can be adjusted by altering the focal lengths of smart sensors 12 and 16.

In one example, the distances of objects 20 and 22 are determined based upon optical flow. In this example, an image is captured by image sensor 28 and an image is captured by image sensor 38 during a first time period. A predetermined time after the first time period an image is captured by image sensor 28 and an image is captured by image sensor 38 during a second time period. The movement of objects 20 and 22 in the images from the first time period to the second time period is optical flow. The relative optical flow of objects 20 and 22 between images captured by image sensor 28 and images captured by image sensor 38, depend on the distance of objects 20 and 22 from aircraft 10 relative to calibrated distance 24. Objects that are closer to aircraft 10 than calibrated distance 24, such as object 20, will have a higher optical flow from one image to the next captured by image processor 38 than from one image to the next taken at the same time by image processor 28. Objects at calibrated distance 24, such as object 22, will have the same optical flow from one image to the next taken by image processors 28 and 38. Objects farther from aircraft 10 than calibrated distance 24 will appear larger in an image captured by image processor 28 than in an image taken at the same time by image processor 38.

Flash illumination using projectors 32 and 42 enables similar image characteristics (other than size) of images captured by image sensors 28 and 38. Flash illumination allows operation in low light levels and eliminates a source of image variation from ambient light. A flash can be emitted from projector 32 and/or 42 for less than 0.1 milliseconds. Image sensors 28 and 38 are triggered by controllers 34 and 40 to capture images during the flash(es). In one example, image sensors 28 and 38 are triggered by controllers 34 and 40 to capture images during strobe flashes from lighting systems of aircraft 10 that are external to the taxi strike alert system. Lighting provided by various combinations of projector 32, projector 42, and or external lighting systems, allows image processors 30 and 36 to verify that image sensors 28 and 38 are capturing images of the same object (s). For circumstances where only a single object is in the field of view, a simple blob analysis measures a randomly sized or bounded object in each image, with a single size comparison needed.

In one example, projector 42 provides short light pulses to illuminate objects 20 and 22. Both the geometric shapes illuminated by the light pulses and the intensity of the returned light, are used to evaluate relative distances of objects 20 and 22. For a surface that is a flat and perpendicular to smart sensors 12 and 16, the size and brightness disparity of the surface is used to determine the distance. The short high intensity light flashed provided by projector 42 is varied from captured image to captured image. Image processors 30 and 36 focus on relevant portions of the captured images referred to as the relevant field of view. The relevant field of view changes from captured image to captured image as aircraft 10 moves.

In one example, objects 20 and 22 are located on the ground. In this example, light gradient disparity between images captured by image sensor 28 and image sensor 38 during a period of time are used in conjunction with size disparity to determine distance. Projector 42 provides short light pulses to illuminate objects 20 and 22. Images captured by image sensor 38 contain limited variation to the light level that is due to the surface reflectivity of objects and surface in the image, but is not impacted by distance. The light source inverse square law for the forward camera is exactly cancelled out by the matching field of view of image sensor 38. Images captured by image sensor 28 contain a cone of light that is brightest when reflected from objects and surfaces closest to smart sensor 16 and gets dimmer the farther from smart sensor 16 the objects and surfaces are. This is a light intensity gradient and the gradient at each point in the image captured by image sensor 28 corresponds to a different distance. In this example, objects 20 and 22 can be ranged using both the size disparity between images captured using image sensors 28 and 38, as well as the light gradient of images captured by image sensor 28. In this example, surface angles can be estimated as well. A perpendicular surface will show no gradient other than from surface reflectivity, or color in images captured by image sensor 28 and image sensor 38. Distance to the perpendicular surface can be determined by the size difference in images captured by image sensor 28 and image sensor 38. A surface at an angle from perpendicular will only vary in the image captured by image sensor 38 due to color and reflectivity of the surface. The surface at an angle from perpendicular will include a light gradient in images captured by image sensor 28.

In one example, a light source external to smart sensor 16 is used to provide light. In this example, uncertainty of an angled surface is removed using smart sensors 12 and 16. The external light source emits a controlled level of light from a known location. This allows smart sensors 12 and 16 to determine both the distance and surface angle of the angled surface. The external light source provides a light gradient on angled surfaces for images captured by image sensor 28 and image sensor 38. The light gradients and sizes of the surface in the images captured by image sensor 28 and image sensor 38 are used by image processors 30 and 36 to determine the size and angle of the surface.

In one example, a light extinction value is used to determine distance of objects and surfaces. There is typically some absorption and dispersion of light in the atmosphere, measured as an extinction value. In this example as the aircraft 10 approaches an object or surface, such as objects 20, the object or surface gets brighter. In this example, light is provided by projector 42. The extinction value is estimated by comparing the brightness of the object or surface between an image captured by image sensor 28 and image sensor 38. The image captured by image sensor 28 captured from a longer distance to the light reflected by object 20. The single light source reflection is measured from two distances, which image processors 30 and 36 use to determine an extinction value. The extinction value can be used to determine the distance of object 20 similar to a light gradient.

Figure 2:
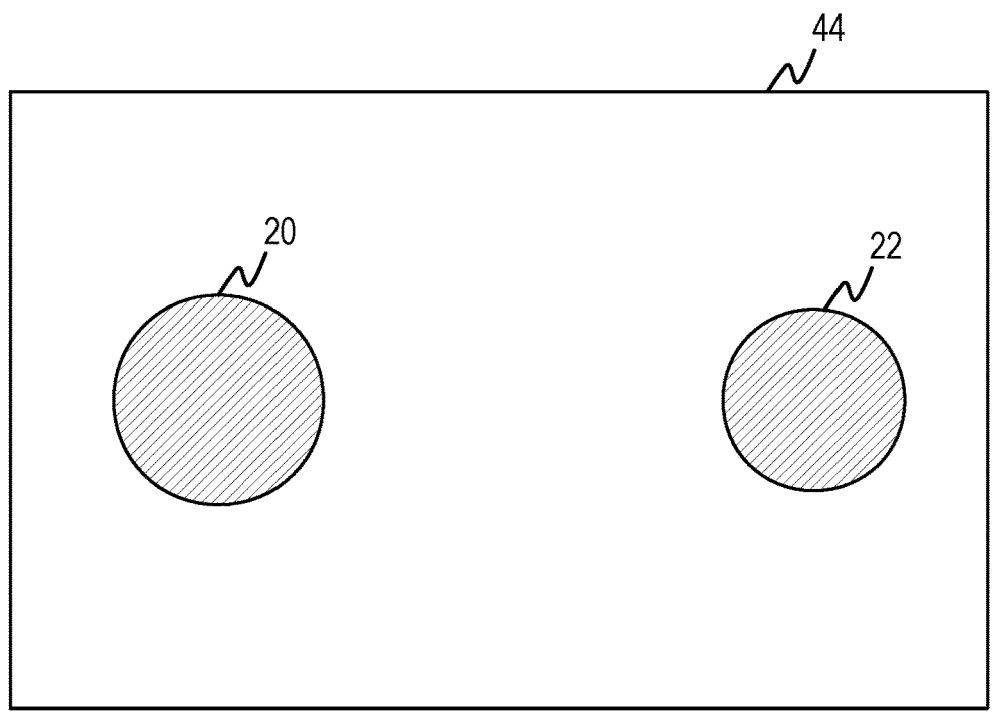
FIG. 2 illustrates images captured by smart sensors of a taxi strike alert system.
Figure 2:
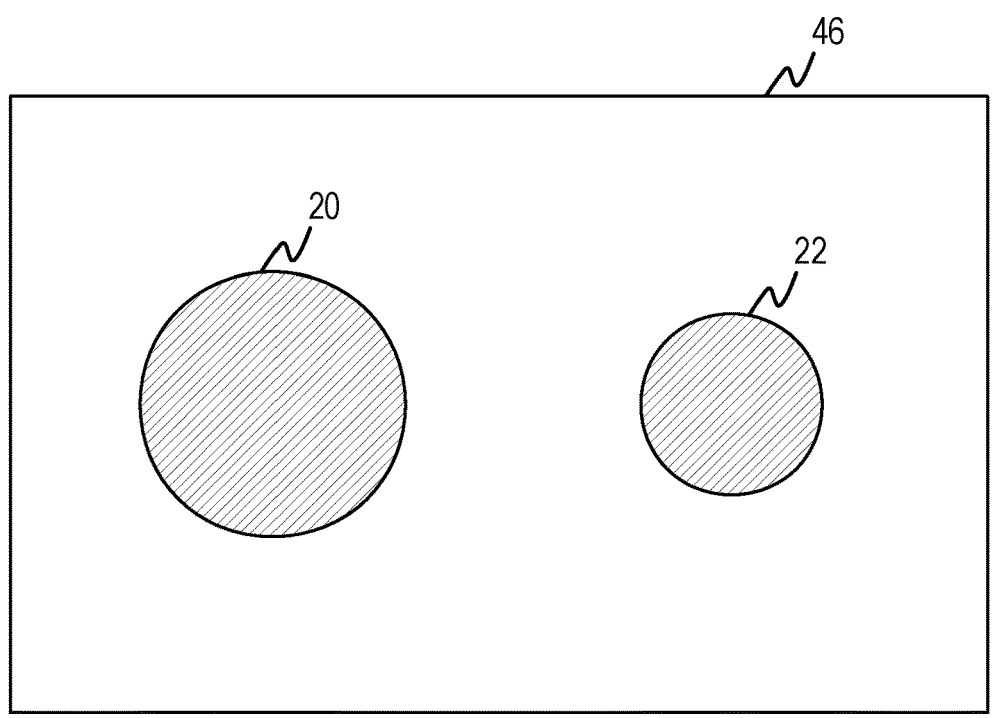

FIG. 2 illustrates image 44 and image 46. Image 44 includes object 20 and object 22. Image 46 includes object 20 and object 22. For purposes of clarity and ease of discussion images 44 and 46 will be discussed with regards to the taxi strike alert system of FIG. 1.

Image 44 is an image captured by image sensor 28 of field of view 14. Image 46 is an image captured by image sensor 38 of field of view 18. Image 44 and image 46 were captured during a time period. The time period can be less than or equal to 0.1 milliseconds. As shown, object 20 is smaller image 44 than in image 46. Object 20 is smaller in image 44 because object 20 is located between aircraft 10 and calibration distance 24. Object 22 is the same size in image 44 and image 46. Object 22 is the same size in images 44 and 46 because object 22 is at calibration distance 24.

Figure 3:
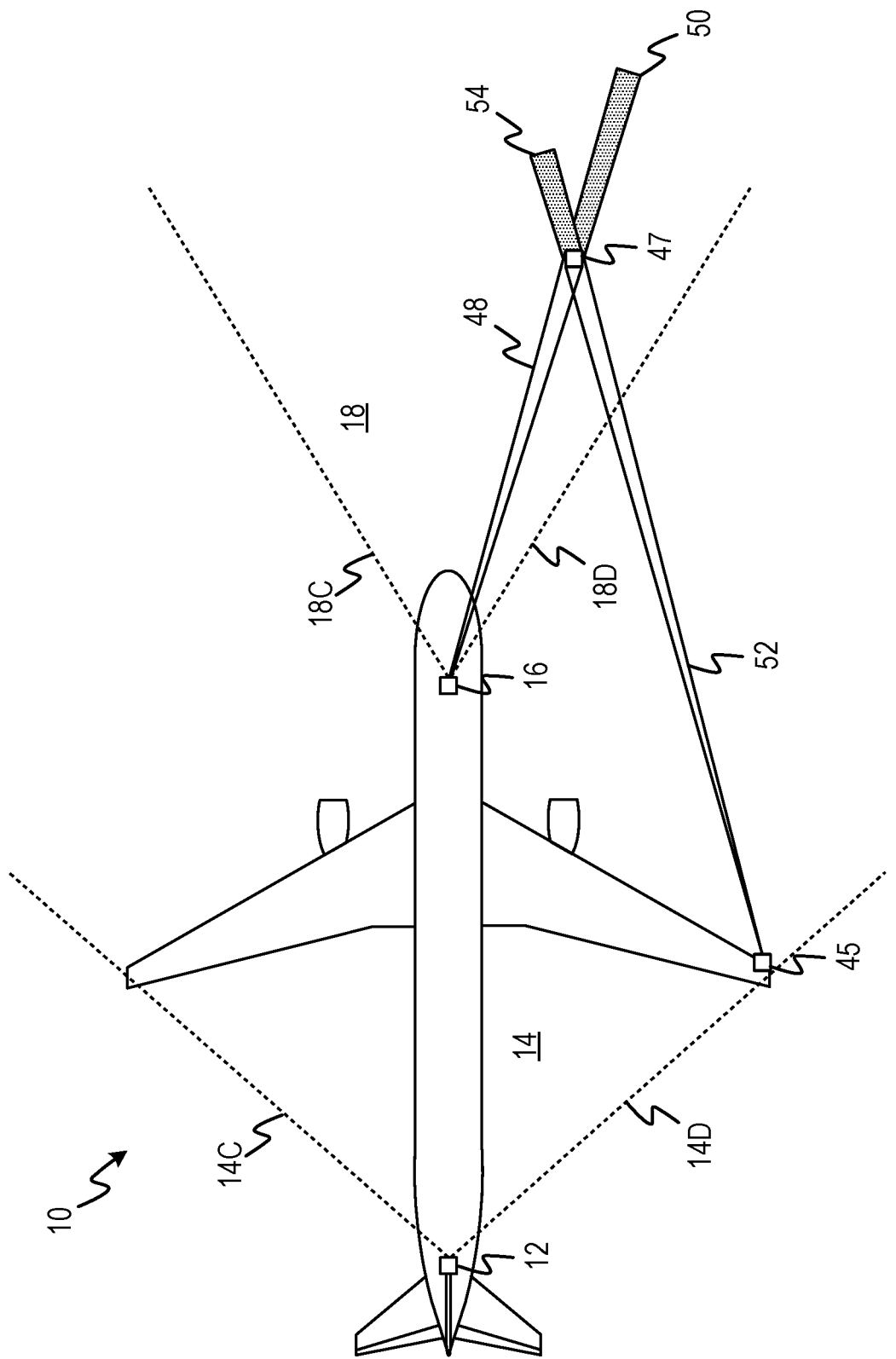
FIG. 3 is an overhead view of a taxi strike alert system.

FIG. 3 is an overhead view of the taxi strike alert system of FIG. 1 including aircraft 10, smart sensor 12, field of view 14, smart sensor 16, field of view 18, light source 45, object 47, projected light 48, shadow 50, projected light 52, and shadow 54. Field of view 14 is shown by dotted lines 14C and 14D. Field of view 18 is shown by dotted lines 18C and 18D.

As shown, taxi strike alert system is configured to use light source 45. Light source 45 is existing aircraft strobe lighting. Light source 45 is one of external device(s) 27 of FIG. 1. In one example, controller 26 receives a signal indicating when light source 45 will flash. In another example, smart sensors 12 and 16 determine the frequency of the flashes from light source 45 through image processing. Smart sensors 12 and 16 are configured to capture images during flashes of light source 45. Smart sensors 12 and 16 are configured to detect shadow 54 which results from object 47 blocking light emitted from light source 45. Smart sensor 16 provides projected light 48 during a time period. Projected light 48 is directed to object 47. Object 47 blocks at least a portion of projected light 48, resulting in shadow 50. Smart sensor 12 can detect shadow 50. Smart sensor 12 and smart sensor 16 are each configured to capture an image when smart sensor 16 provides projected light 48. Smart sensor 12 is configured to capture another image during a flash of light source 45. Smart sensors 12 and 16 are configured to use the image angular disparity of shadows 50 and 54 in the captured images and the known locations of smart sensors 12 and 16 to determine the distance of object 47 from aircraft 10.

In some examples, smart sensors 12 and 14 have different fields of view, and capture different sized images. Sensor 28 may have a resolution quadruple the resolution of sensor 38 with twice as many pixels in each direction. At calibration distance 24 images captured by smart sensors 12 and 14 will have the same angular size per pixel. This matching angular resolution may be performed via optics, or via pixel binning, where the resolution of a sensor is reduced by a factor of 2. Pixel binning can be performed in the hardware of sensors 28 and/or 38, or performed during image processing by processors 30 and/or 36.

The wider field of view of smart sensor 12 allows smart sensor 12 to monitor for objects approaching the aircraft wing tips and engine of aircraft 10. Smart sensor 12 can use video tracking and processing to estimate object distances to aircraft 10 by tracking objects in a sequence captured images. The known size and distance of aircraft wing tips and engines of aircraft 10 reduces the processing required of video processing done in this manner.

Accordingly, apparatus, systems, and associated methods herein, allow the detection of objects and accurate detection of the distances of the objects from the aircraft. Utilizing the dual smart sensor arrangement described herein provides the distance of objects in front of the aircraft based upon relative size, light gradients, optical flow, and/or shadows cast by the objects. Aircraft pilots are provided with accurate distances to objects in the aircraft's path assisting the pilots in avoiding costly collisions.

Discussion of Possible Embodiments

The following are non-exclusive descriptions of possible embodiments of the present invention.

A system includes a first smart sensor, a second smart sensor, and at least one image processor. The first smart sensor is attachable to a front portion of an aircraft along a longitudinal axis of the aircraft. The first smart sensor is configured to sense light in a forward direction when attached to the aircraft and to capture an image during a first time period. The second smart sensor is attachable to a rear portion of an aircraft along the longitudinal axis of the aircraft. The second sensor is configured to sense light in the forward direction and to capture a second image during the first time period. The at least one image processor is configured to identify at least one object in the first and second images, to determine a first size of the at least one object in the first image and a second size of the at least one object in the second image, and to determine a distance of the at least one object from the aircraft based upon the first size and the second size.

The system of the preceding paragraph can optionally include, additionally and/or alternatively, any one or more of the following features, configurations and/or additional components:

A further embodiment of the foregoing system, wherein the first and second smart sensors can be calibrated such that the first size and the second size are equal when the at least one object is at a calibration distance from the system, the first size is larger than the second size when the at least one object is closer than the calibration distance from the system, and the first size is smaller than the second size when the at least one object is farther than the calibration distance from the system.

A further embodiment of any of the foregoing systems, wherein the first smart sensor can include a first image sensor configured to sense light and a first projector configured to emit light. The second smart sensor can include a second image sensor configured to sense light and a second projector configured to emit light.

A further embodiment of any of the foregoing systems can further include at least one controller configured to provide commands to the first and second projectors.

A further embodiment of any of the foregoing systems, wherein the first projector can be configured to emit structured light.

A further embodiment of any of the foregoing systems can further include at least one alarm configured to provide an alert based upon the determined distance of the at least one object from the aircraft.

A further embodiment of any of the foregoing systems can further include at least one display configured to provide the determined distance of the at least one object from the aircraft.

A further embodiment of any of the foregoing systems, wherein the first smart sensor can be further configured to capture a third image during a second time period and the second smart sensor can be further configured to capture fourth image during the second time period. The at least one image processor can be further configured to detect a first optical flow of the at least one object based upon the first and third captured images, to determine a second optical flow based upon the second and fourth captured images, and to determine the distance of the at least one object from the aircraft based upon the first and second optical flow.

A further embodiment of any of the foregoing systems, wherein the first smart sensor can include a projector configured to emit light during the first time period, and the at least one image processor can be further configured to detect a first light gradient on the at least one object in the second captured image and to further determine the distance of the at least one object from the aircraft based upon the first light gradient.

A further embodiment of any of the foregoing systems, wherein the at least one image processor can be further configured to determine a second light gradient in the first captured image and to determine a surface angle of the at least one object based upon the first and second light gradient.

A further embodiment of any of the foregoing systems, wherein the first smart sensor can include a projector configured to emit light during the first time period and the second smart sensor can be configured to capture a third image during a second time period with the second time period occurring during a flash of a light source of the aircraft, and wherein the at least one image processor can be further configured to detect a first shadow in the first image, a second shadow in the second image, and a third shadow in the third image and to determine the distance of the at least one object from the aircraft based upon the first, second, and third shadow.

A method includes capturing an image in a forward direction of an aircraft during a first time period using a first smart sensor attachable to a front portion of an aircraft along a longitudinal axis of the aircraft, capturing a second image in the forward direction during the first time period using a second smart sensor attachable to a rear portion of an aircraft along the longitudinal axis of the aircraft, identifying at least one object in the first and second images using at least one image processor, determining a first size of the at least one object in the first image using the at least one image processor; determining a second size of the at least one object in the second image using the at least one image processor, and determining a distance of the at least one object from the aircraft based upon the first size and the second size using the at least one image processor.

The method of the preceding paragraph can optionally include, additionally and/or alternatively, any one or more of the following features, configurations, additional components, and/or steps:

A further embodiment of the foregoing system, wherein determining the distance of the at least one object from the aircraft can be further based upon a calibration distance of the first and second smart sensors.

A further embodiment of any of the foregoing methods can further include providing an alert based upon the determined distance of the at least one object from the aircraft using at least one alarm.

A further embodiment of any of the foregoing methods can further include displaying the determined distance of the at least one object from the aircraft using at least one display.

A further embodiment of any of the foregoing methods can further include capturing a third image during a second time period using the first smart sensor, capturing a fourth image during the second time period using the second smart sensor, detecting a first optical flow of the at least one object based upon the first and third image using the at least one image processor, detecting a second optical flow of the at least one object based upon the second and fourth images, and determining a distance of the at least one object from the aircraft is further based upon the first and second optical flow.

A further embodiment of any of the foregoing methods, wherein providing light during the first time period can be done using a projector of the first smart sensor, detecting a first light gradient on the at least one object in the second image can be done using the at least one image processor, and determining the distance of the at least one object from the aircraft to the aircraft can be further based upon the first light gradient.

A further embodiment of any of the foregoing methods can further include determining a second light gradient of the at least one object in the first image using the at least one image processor, and determining a surface angle of the at least one object based upon the first and second light gradient using the at least one image processor.

A further embodiment of any of the foregoing methods can further include providing light during the first time period using a projector of the first smart sensor, capturing a third image using the second smart sensor during a second time period with the second time period occurring during a flash of a light source of the aircraft, detecting a first shadow of the at least one object in the first image, detecting a second shadow of the at least one object in the second image, and detecting a third shadow of the at least one object in the third image. Determining the distance of the at least one object from the aircraft to the aircraft can be further based upon the first, second, and third shadow of the at least one object.

In another embodiment, a system includes a first smart sensor, a second smart sensor, and a controller. The first smart sensor is attachable to a front portion of an aircraft along a longitudinal axis of the aircraft. The first smart sensor comprises a first image sensor, a projector, and an image processor. The first image sensor is configured to sense light in a forward direction of the aircraft and to capture an image during a first time period. The projector is configured to project structured light. The second smart sensor is attachable to a rear portion of an aircraft along the longitudinal axis of the aircraft. The second smart sensor comprises a second image sensor configured to sense light in the forward direction and to capture a second image during the first time period. The controller is configured to provide control signals to the first and second smart sensors. The control signals including data to indicate the first time period and the pattern of the structured light. The image processor is configured to identify at least one object in the first and second images, to determine a first size of the at least one object in the first image and a second size of the at least one object in the second image, and to determine a distance of the at least on object from the aircraft based upon the first size and the second size.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
    a first smart sensor attachable to a front portion of an aircraft along a longitudinal axis of the aircraft, the first smart sensor configured to capture a first image of objects located in a forward direction of the aircraft during a first time period;
    a second smart sensor attachable to a rear portion of an aircraft along the longitudinal axis of the aircraft, the second smart sensor configured to capture a second image of objects located in the forward direction of the aircraft during the first time period, wherein the first smart sensor has a first field of view that is wider than a second field of view of the second smart sensor such that a calibration-distance object, which is located at a calibration distance from the system and imaged in both the first and second images, has a first calibration size in the first image equal to a second calibration size in the second image; and
    at least one image processor configured to identify at least one identified object imaged in both of the first and second images, to determine a first determined size of the at least one identified object in the first image and a second determined size of the at least one identified object in the second image, and to determine a distance of the at least one identified object from the aircraft based upon the first determined size relative to the second determined size.

2. The system of claim 1, wherein the first determined size is larger than the second determined size when the at least one object is closer than the calibration distance from the system, and the first determined size is smaller than the second determined size when the at least one object is farther than the calibration distance from the system.

3. The system of claim 1, wherein:
    the first smart sensor comprises:
        a first image sensor configured to sense light; and
        a first projector configured to emit light; and
    the second smart sensor comprises:
        a second image sensor configured to sense light; and
        a second projector configured to emit light.

4. The system of claim 3, further comprising:
    at least one controller configured to provide commands to the first and second projectors.

5. The system of claim 3, wherein the first projector is configured to emit structured light.

6. The system of claim 1, further comprising:
at least one alarm configured to provide an alert based upon the determined distance of the at least one identified object from the aircraft.

7. The system of claim 1, further comprising:
at least one display configured to provide the determined distance of the at least one identified object from the aircraft.

8. The system of claim 1, wherein:
the first smart sensor is further configured to capture a third image during a second time period;
the second smart sensor is further configured to capture fourth image during the second time period; and
the at least one image processor is further configured to detect a first optical flow of the at least one identified object based upon the first and third images, to determine a second optical flow based upon the second and fourth images, and to determine the distance of the at least one identified object from the aircraft based upon the first and second optical flow.

9. The system of claim 1, wherein the at least one image processor is further configured to determine a second light gradient in the first image and to determine a surface angle of the at least one identified object based upon the first and second light gradient.

10. The system of claim 1, wherein:
the second smart sensor is configured to capture a third image during a second time period, the second time period occurring during a flash of a light source of the aircraft;
the at least one image processor is further configured to detect a first shadow in the first image, a second shadow in the second image, and a third shadow in the third image and to determine the distance of the at least one object from the aircraft based upon the first, second, and third shadow.

11. The system of claim 1, wherein:
the at least one image processor is further configured to detect a first light gradient on the at least one identified object in the first image and to further determine the distance of the at least one identified object from the aircraft based upon the first light gradient.

12. A method comprising:
configuring a first smart sensor to have a first field of view;
capturing a first image of objects located in a forward direction of an aircraft during a first time period using a first smart sensor attachable to a front portion of an aircraft along a longitudinal axis of the aircraft;
configuring a second smart sensor to have a second field of view;
capturing a second image of objects located in the forward direction of the aircraft during the first time period using a second smart sensor attachable to a rear portion of an aircraft along the longitudinal axis of the aircraft, wherein a first field of view is wider than the second field of view such that a calibration-distance object, which is located at a calibration distance from the aircraft and captured in both the first and second images, has a first calibration size in the first image equal to a second calibration size in the second image; and
identifying at least one identified object imaged in both of the first and second images using at least one image processor;

determining a first determined size of the at least one identified object in the first image using the at least one image processor;
determining a second determined size of the at least one identified object in the second image using the at least one image processor;
determining a distance of the at least one identified object from the aircraft based upon the first determined size relative to the second determined size using the at least one image processor.

13. The method of claim 12, further comprising:
providing an alert based upon the determined distance of the at least one object from the aircraft using at least one alarm.

14. The method of claim 12, further comprising displaying the determined distance of the at least one object from the aircraft using at least one display.

15. The method of claim 12, further comprising:
capturing a third image during a second time period using the first smart sensor;
capturing a fourth image during the second time period using the second smart sensor;
detecting a first optical flow of the at least one object based upon the first and third image using the at least one image processor;
detecting a second optical flow of the at least one object based upon the second and fourth images; and
determining a distance of the at least one object from the aircraft is further based upon the first and second optical flow.

16. The method of claim 12, further comprising:
determining a second light gradient of the at least one object in the first image using the at least one image processor; and
determining a surface angle of the at least one object based upon the first and second light gradient using the at least one image processor.

17. The method of claim 12, further comprising:
providing light during the first time period using a projector of the first smart sensor;
capturing a third image using the second smart sensor during a second time period, the second time period occurring during a flash of a light source of the aircraft;
detecting a first shadow of the at least one object in the first image;
detecting a second shadow of the at least one object in the second image;
detecting a third shadow of the at least one object in the third image; and
wherein determining the distance of the at least one object from the aircraft to the aircraft is further based upon the first, second, and third shadow of the at least one object.

18. The method of claim 12, wherein:
providing light during the first time period using a projector of the first smart sensor;
detecting a first light gradient on the at least one object in the second image using the at least one image processor, and
wherein determining the distance of the at least one object from the aircraft to the aircraft is further based upon the first light gradient.

19. A system comprising:
a first smart sensor attachable to a front portion of an aircraft along a longitudinal axis of the aircraft, the first smart sensor comprising:

a first image sensor configured to capture a first image of objects located in a forward direction of the aircraft during a first time period; and a projector configured to emit structured light onto the objects located in the forward direction of the aircraft during the first time period;

a second smart sensor attachable to a rear portion of an aircraft along the longitudinal axis of the aircraft, the second smart sensor comprising a second image sensor configured to capture a second image of objects located in the forward direction of the aircraft during the first time period, wherein the first smart sensor has a first field of view that is wider than a second field of view of the second smart sensor such that a calibration-distance object, which is located at a calibration distance from the system and imaged in both the first and second images, has a first calibration size in the first image equal to a second calibration size in the second image; and a controller to provide control signals to the first and second smart sensors, the control signals including data to indicate the first time period and the pattern of the structured light, and an image processor is configured to identify at least one identified object in both of the first and second images, to determine a first determined size of the at least one identified object in the first image and a second determined size of the at least one identified object in the second image, and to determine a distance of the at least one identified object from the aircraft based upon the first determined size relative to the second determined size.

* * * * *